United States Patent
Hein (10) Patent No.: US 8,860,239 B2
(45) Date of Patent: Oct. 14, 2014

(54) WIND OR WATER ENERGY INSTALLATION

(75) Inventor: Peter Hein, Ruthnick (DE)

(73) Assignee: Venpower GmbH (DE)

( * ) Notice: Subject to any disclaimer, the term of this patent is extended or adjusted under 35 U.S.C. 154(b) by 137 days.

(21) Appl. No.: 13/496,988

(22) PCT Filed: Aug. 30, 2010

(86) PCT No.: PCT/EP2010/005607
§ 371 (c)(1),
(2), (4) Date: Mar. 19, 2012

(87) PCT Pub. No.: WO2011/032674
PCT Pub. Date: Mar. 24, 2011

(65) Prior Publication Data
US 2012/0175884 A1 Jul. 12, 2012

(30) Foreign Application Priority Data
Sep. 17, 2009 (EP) .................................... 09075430

(51) Int. Cl.
*F03D 9/00* (2006.01)
*H02K 21/44* (2006.01)
*H02K 7/18* (2006.01)

(52) U.S. Cl.
CPC ............. *H02K 21/44* (2013.01); *H02K 7/1838* (2013.01)
USPC .............................................................. 290/55

(58) Field of Classification Search
USPC .................... 290/54–55; 310/156.45, 156.38, 310/156.53; 351/156.35
See application file for complete search history.

(56) References Cited

U.S. PATENT DOCUMENTS

| | | | | |
|---|---|---|---|---|
| 5,866,964 | A  * | 2/1999 | Li ................................. | 310/198 |
| 6,703,745 | B2 * | 3/2004 | Chu ......................... | 310/156.45 |
| 6,765,321 | B2 * | 7/2004 | Sakamoto .................. | 310/49.08 |
| 7,332,837 | B2 * | 2/2008 | Ward et al. ...................... | 310/54 |
| 7,535,146 | B2 | 5/2009 | Ackva et al. | |
| 2005/0035677 | A1 * | 2/2005 | Evans et al. .............. | 310/156.35 |

FOREIGN PATENT DOCUMENTS

| | | |
|---|---|---|
| EP | 0199496 | 10/1986 |
| EP | 1746707 | 1/2007 |
| GB | 2428903 | 2/2007 |
| WO | 2008119055 | 10/2008 |

OTHER PUBLICATIONS

International Search Report for PCT/EP2010/005607, English translation attached to Original, Both completed by the European Patent Office on Oct. 19, 2011, All together 7 Pages.

* cited by examiner

*Primary Examiner* — Jean F Duverne
(74) *Attorney, Agent, or Firm* — Brooks Kushman PC (57) ABSTRACT

A wind or water energy installation for generating electrical energy, an installation having at least one propeller and at least one generator including at least one rotor, at least one stator and at least one magnetic circuit generating a magnetic flux. The at least one magnetic circuit has at least one magnet on the stator side and at least one coil on the stator side, through which at least part of the magnetic flux of the stator-side magnet flows, and the magnetic circuit is closed by the rotor which has a magnetic resistance (Rm) dependent on its respective rotational angle, on its surface facing the stator, such that the size of the magnetic flux in the at least one stator-side coil depends on the respective rotational angle of the rotor and changes when the rotor rotates.

17 Claims, 8 Drawing Sheets

Fig. 14

WIND OR WATER ENERGY INSTALLATION

CROSS-REFERENCE TO RELATED APPLICATION

This application is the U.S. national phase of PCT Appln. No. PCT/EP2010/005607 filed Aug. 30, 2010, which claims priority to European Application No. 09 075 430.0 filed Sep. 17, 2009, the disclosures of which are incorporated in their entirety by reference herein.

The invention relates to a wind or water energy installation having the features according to the precharacterizing clause of claim 1.

For many years, electrical energy has been obtained from the wind with the aid of wind turbines, which have become ever larger. The achievable power levels are dependent, inter alia, on the diameter of the wind turbine. Higher power levels therefore also mean larger wind turbine diameters and larger propeller blade lengths. Since the circumferential speed of the propeller tips is technically limited, this results in ever lower rotation speeds.

In order to be able to use low-cost generators having small dimensions and a low weight for converting mechanical power into electrical energy, gearboxes are usually arranged between the propeller and electrical generator.

The invention is based on the object of specifying a wind or water energy installation which can generate high electrical power levels but nevertheless is of simple and lightweight design.

According to the invention, this object is achieved by a wind or water energy installation having the features claimed in patent claim 1. Advantageous refinements of the wind or water installation according to the invention are described in dependent claims.

According to the invention, a wind or water energy installation is accordingly provided for production of electrical energy having at least one propeller and at least one generator, which comprises at least one rotor, at least one stator and at least one magnetic circuit producing a magnetic flux. The at least one magnetic circuit comprises at least one stator-side magnet and at least one stator-side coil through which at least a portion of the magnetic flux of the stator-side magnet flows. The magnetic circuit is closed by the rotor, wherein, on its surface facing the stator, the rotor has a magnetic reluctance, which is dependent on its respective rotation angle, such that the magnitude of the magnetic flux in the at least one stator-side coil is dependent on the respective rotation angle of the rotor, and varies during rotation of the rotor.

One major advantage of the wind or water energy installation according to the invention is that all of the components which are heated and may need to be cooled during operation of the generator in order to prevent limit temperatures from being exceeded are arranged in the stator of the generator. Cooling of the stator from the outside is technically relatively simple, and can be carried out at low cost. Those parts and elements which carry flux, are arranged in the rotor and can be heated by remagnetization or eddy currents, and can also be heated by the stator by heat transfer and/or radiation can be formed by parts whose temperature is not critical in the case of the wind or water energy installation according to the invention, as a result of which there is no need for additional cooling. In other words, one major advantage of the wind or water energy installation according to the invention is that only stator sections need be cooled and there is no need for cooling of the rotor, even when very high electrical power levels are produced.

The wind or water energy installation is preferably an installation which has a rating of at least 1 kW. A rating such as this is generally necessary in order to allow economic use in power transmission systems.

According to a preferred refinement of the wind or water energy installation, it is provided that the propeller is connected to the rotor of the generator such that they rotate together. There is therefore no need for a gearbox between the rotor and the propeller, thus minimizing the weight and costs.

Preferably, the stator-side magnets are permanent magnets. Alternatively, it is also possible to use electromagnets for production of a magnetic flux, instead of permanent magnets or in combination with permanent magnets.

On its face facing the rotor, for example on its inner face facing the rotor, the stator has preferably a multiplicity of magnetic circuits, which comprise in each case at least one stator-side magnet and in each case at least one stator-side coil and which are each magnetically closed by the rotor. The stator-side coils may be electrically interconnected in order to make it possible to provide the appropriate currents or voltages, depending on the configuration of the electrical power supply system to which the wind or water energy installation is connected.

Preferably, the arrangement of the magnetic circuits on the stator and the local distribution of the magnetic reluctance on the rotor is in each case rotationally symmetrical.

In order to allow a polyphase, for example three-phase, electricity production, it is considered to be advantageous if the rotational symmetry angle of the arrangement of the magnetic circuits on the stator and the rotational symmetry angle of the local distribution of the magnetic reluctance on the rotor are different. A rotational symmetry angle difference leads to a different pole pitch on the stator and on the rotor, thus making it possible to generate electric current for polyphase systems.

The rotational symmetry angle of the stator and that of the rotor may, of course, also be identical, if the intention is to produce only a single current and voltage phase.

Preferably, on its surface facing the stator, the rotor has teeth which extend radially outward. A tooth structure or a tooth profile makes it possible to produce a magnetic reluctance, which is dependent on the respective rotation angle of the rotor, on the surface of the rotor in a particularly simple manner. Preferably, the teeth on the surface of the rotor consist of a material having low magnetic reluctance, that is to say a material which causes a high magnetic flux when a magnetic field is applied. For example, one material which is suitable for the teeth is ferromagnetic material, since it has a very high permeability.

The intermediate space between adjacent teeth of the stator may, for example, be entirely or partially filled with a material which has a higher magnetic reluctance than the material of the teeth. For example, the intermediate space between adjacent teeth may be filled with a plastic or a resin.

However, it is considered to be particularly advantageous for the intermediate space between adjacent teeth to remain free, since, when the rotor rotates, exposed teeth lead to swirling of the air in the air gap between the stator and the rotor, thus resulting in cooling of the rotor and the stator.

Particularly preferably, the stator-side section of the at least one magnetic circuit has a flux-guiding element, which is passed through the at least one stator-side coil, with the cross-sectional area of the flux-guiding element in the coil area being less than the cross-sectional area of the stator-side magnet. If the cross sections are refined in this way, this leads to flux concentration in the area of the stator-side coil.

In a corresponding manner, it is possible for the flux-guiding stator-side element to be smaller in the coil area than in the area of its limb ends, with which it forms the interface to the rotor. This refinement as well leads to flux concentration in the coil area, but in this case it is possible to influence the air-gap field at the interface between the rotor and the stator.

In order to guide the lines of force through the stator in as optimum a manner as possible, the stator-side sections of the magnetic circuits can each be provided with at least one magnetic flux barrier, which has a higher specific magnetic reluctance than the rest of the material in the respective stator-side section. Flux barriers such as these modify the profile of the lines of force, since the lines of force cannot pass through the flux barriers, or can do so only poorly, and in consequence have to (at least predominantly) pass around the flux barriers.

Furthermore, it is considered to be advantageous for the stator-side magnet or magnets to be embedded in the flux-guiding stator-side material. The term "embed" (or "bury") should be understood in this case as meaning that the stator-side magnets are completely surrounded (on the entire surface) by flux-guiding stator-side material and are thus in particular also separated from the stator inner face facing the rotor and the stator outer face averted from the rotor. Although the result of such "embedding" is that a certain proportion of the magnetic flux of the stator-side magnets is magnetically short-circuited by the flux-guiding stator-side material and as a result the efficiency is reduced, the "embedding" has the advantage that separate attachment means can be dispensed with and furthermore it is possible, for example, to "encapsulate" the stator-side magnets, thereby achieving efficient protection against environmental influences. This is because magnetic material is relatively brittle and, as a result of the manufacturing process, always has small cracks and microcracks, as a result of which magnetic material is always susceptible to corrosion: For example, in the case of a generator insert in the sea or at sea, the stator-side magnets can thus become damaged, since moisture and salt can penetrate into cracks and corrosion and/or bursting or spalling can occur. By "embedding" the stator-side magnets in the flux-guiding stator-side material, efficient protection against environmental influences is achieved.

Converters are preferably used to convert the generator output voltage and output frequency, which are dependent on the propeller rotation speed.

It is also possible to incline the rotor structure in one direction or—for example half in each case—in both directions (arrow inclination) in order, inter alia, to reduce cogging torques and to positively influence the sound which is produced.

The invention will be explained in more detail in the following text with reference to exemplary embodiments; in this case, by way of example.

For the sake of clarity, the same reference symbols are always used for identical or comparable components in the figures.

Figure 1:
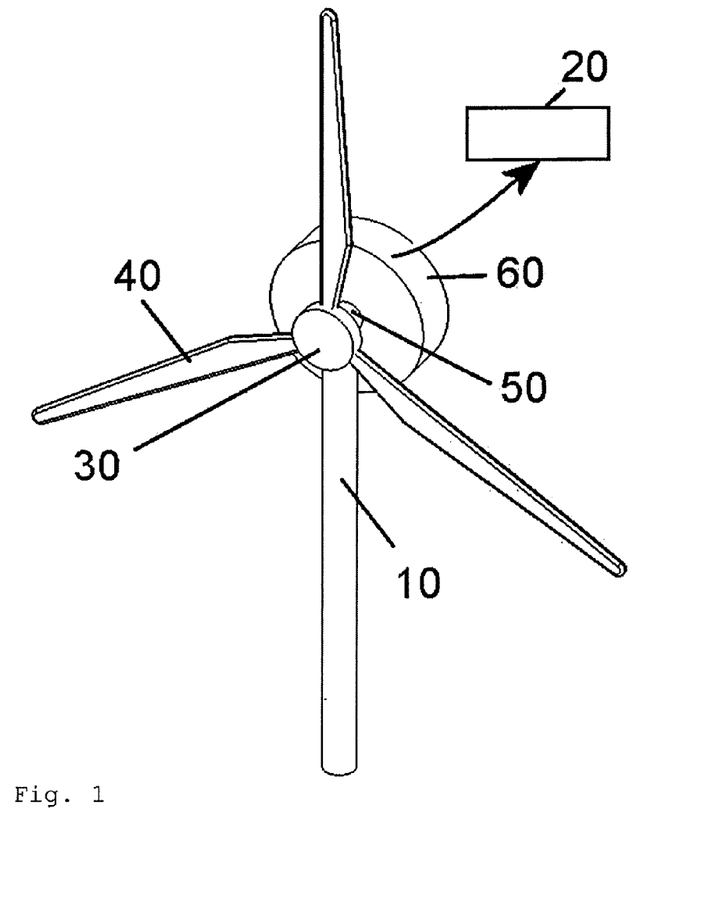
FIG. 1 shows one exemplary embodiment of an arrangement having a wind energy installation according to the invention, which is connected to a power transmission system.

FIG. 1 shows an arrangement having a wind energy installation 10 which is connected to a power transmission system 20. The wind energy installation 10 converts wind energy to electrical energy, and feeds this into the power transmission system 20.

The wind energy installation 10 comprises a propeller 30, which may have a plurality of blades 40. In the exemplary embodiment shown in FIG. 1, the propeller 30 has three blades, however, of course, the propeller 30 may also have more or fewer blades.

The propeller 30 rotates about a shaft 50 which is connected to a generator 60 of the wind energy installation 10. If the action of the wind on the propeller 30 causes it to rotate about the shaft 50, as a result of which the generator 60 will produce electric current I, which is fed into the power transmission system 20.

Figure 2:
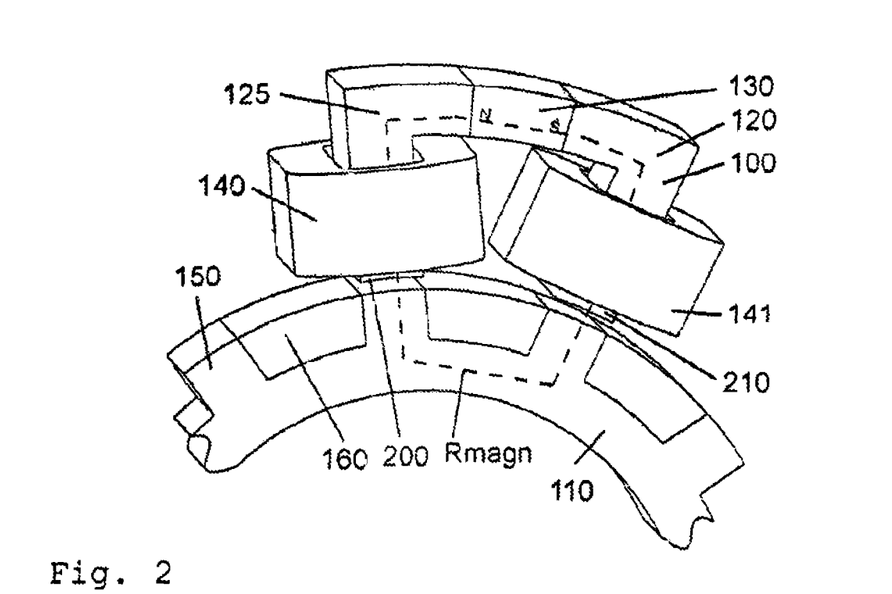
FIGS. 2 to 12 show various exemplary embodiments for a generator for the wind energy installation shown in FIG. 1.

By way of example, FIG. 2 shows one possible embodiment of the generator 60, illustrated partially. FIG. 2 thus shows a section 100 of a stator of the generator 60, which stator will not be described in any more detail. In addition, the figure shows a section 110 of a rotor of the generator 60, which rotor will not be described in any more detail.

The reference symbol 120 in FIG. 2 indicates a magnetic circuit which comprises a stator-side magnet 130 as well as two stator-side coils 140 and 141. At least a portion of the magnetic flux which is produced by the stator-side magnet 130 flows through the stator-side coils 140 and 141.

Furthermore, the magnetic circuit 120 comprises the section 100 of the stator and the section 110 of the rotor. The section 110 of the rotor forms a magnetic reluctance Rm which depends on the respective rotation angle of the rotor relative to the stator. For example, FIG. 2 shows that the section 110 has teeth 150 which form a low magnetic reluctance. The teeth 150 are separated from one another by gaps 160, which form a magnetic reluctance which is higher than that of the teeth 150. When the rotor is now rotated with respect to the stator, the total magnetic reluctance for the magnetic circuit 120 will vary periodically and will always depend on the respective rotation angle of the rotor relative to the stator.

For example, if it is assumed that the stator-side magnet 130 produces a constant magnetic field strength, then the magnetic flux which flows through the magnetic circuit 120 will therefore depend on the respective position of the rotor. If the rotor is aligned as illustrated in FIG. 2, then the magnetic flux in the magnetic circuit 120 will be a maximum. In contrast, if the rotor is rotated, then the magnetic flux will decrease. The flux variation in the two stator-side coils 140 and 141 results in a voltage being induced at the conductor ends of the two coils, which can be output as electrical energy to the power transmission system 20 as shown in FIG. 1.

Furthermore, as can be seen from FIG. 2, the flux-guiding stator-side element 125 has a U-shaped cross section and has two limb ends 200 and 210, which interact with the teeth 150 and the gaps 160 in the section 110 of the rotor. The configuration of the flux-guiding stator-side element 125 with the U-shaped cross section should in this case be understood only as an example; the flux-guiding stator-side element 125 may, of course, also have different shapes, as will be explained in more detail further below in conjunction with other exemplary embodiments.

In order to achieve a smooth rotor surface, the gaps 160 may be filled with a material which has a different magnetic reluctance to that of the teeth 150. For example, the gaps 160 may be filled with plastic or a resin.

However, it is considered to be particularly advantageous for the gaps 160 to be filled only with air, as a result of which air is swirled in the gap between the rotor and the stator when the rotor rotates, and both the rotor and the stator are cooled by the airflow.

The stator-side magnet 130 may be a permanent magnet or an electromagnet.

Figure 3:
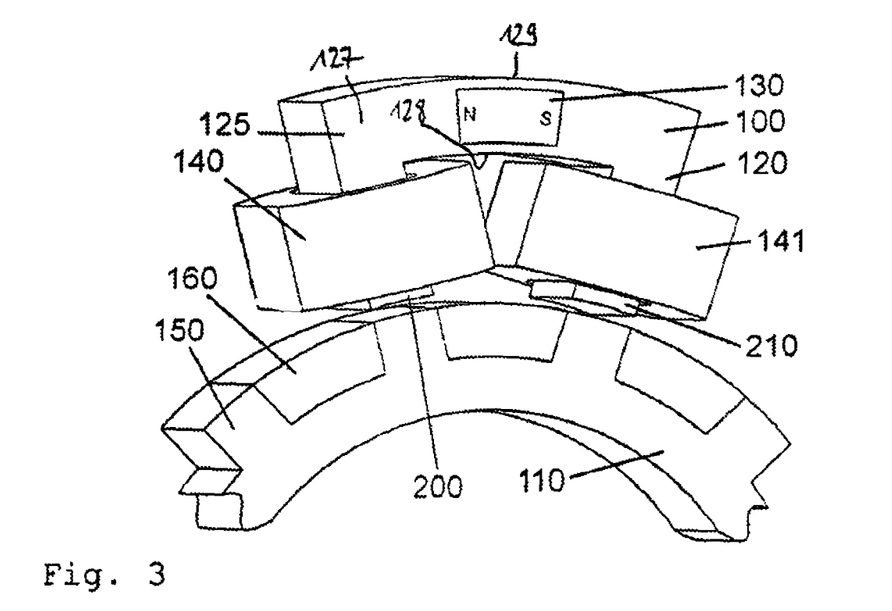

FIG. 3 shows another exemplary embodiment for one possible refinement of the generator 60 shown in FIG. 1. In the exemplary embodiment shown in FIG. 3, the stator-side magnet 130 is embedded in the flux-guiding stator-side material 127 of the flux-guiding stator-side element 125. The term "embed" (or "bury") should be understood in this case as meaning that the stator-side magnet 130 is completely surrounded, i.e. on its entire surface, by flux-guiding stator-side material 127 of the flux-guiding stator-side element 125 and is thus for example also separated from the stator inner face 128, facing the rotor, of the flux-guiding stator-side element 125 and the stator outer face 129, averted from the rotor, of the flux-guiding stator-side element 125. Apart from this, the exemplary embodiment shown in FIG. 3 corresponds to the exemplary embodiment shown in FIG. 2.

Figure 4:
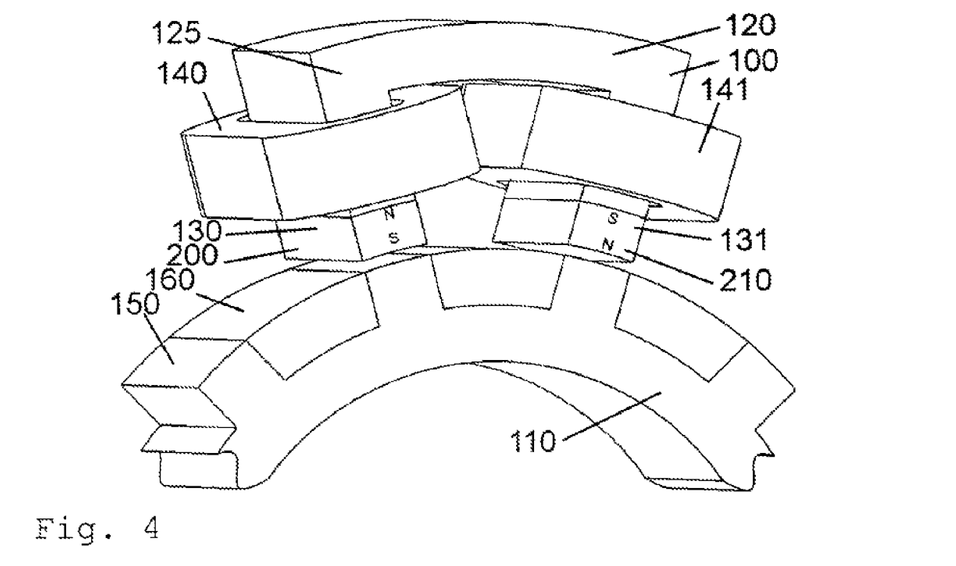

By way of example, FIG. 4 shows one exemplary embodiment, in which there are two stator-side magnets 130 and 131. The two stator-side magnets are located at the limb ends 200 and 210 of the U-shaped flux-guiding stator-side element 125. Apart from this, the exemplary embodiment shown in FIG. 4 corresponds to the exemplary embodiment shown in FIGS. 2 and 3.

Figure 5:
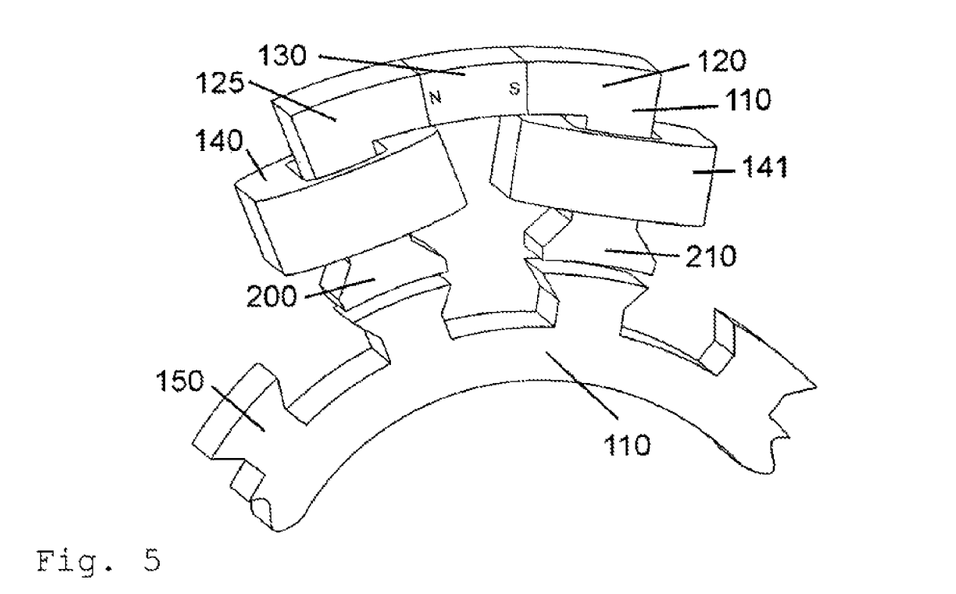

FIG. 5 shows one exemplary embodiment of a generator in which the flux-guiding stator-side element 125 has a smaller cross-sectional area in the area of the stator-side coils 140 and 141 than in the area of the limb ends 200 and 210. Preferably, the shape of the teeth 150 in the rotor is matched to the shape and the cross section of the limb ends 200 and 210; for example, the cross sections of the limb ends and the cross sections of the teeth 150 are identical.

Figure 6:
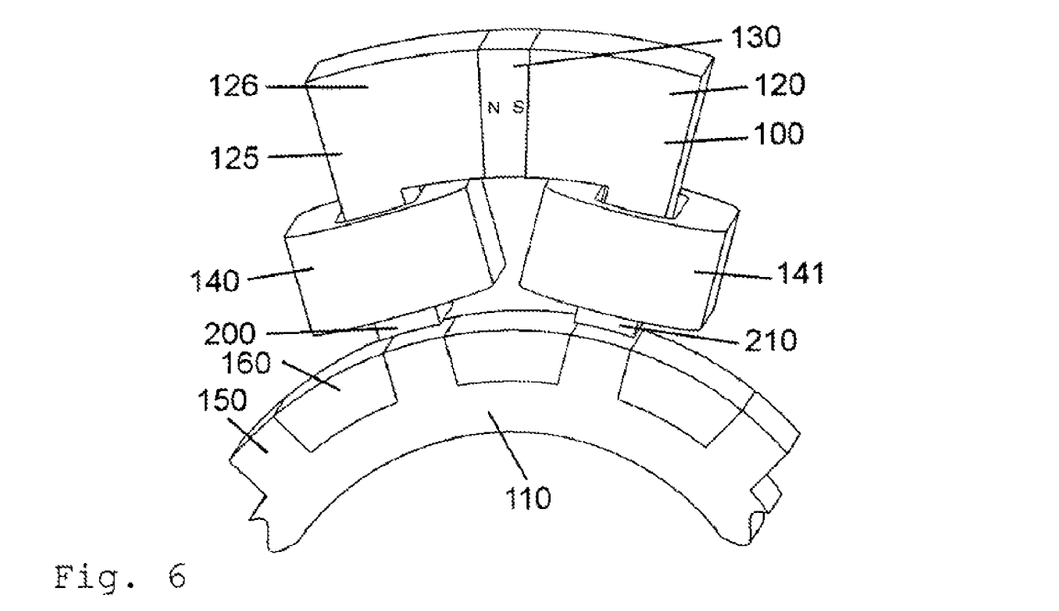

FIG. 6 shows one exemplary embodiment of a generator 60 in which flux is likewise concentrated in the area of the stator-side coils 140 and 141. As can be seen, the flux-guiding stator-side element 125 has a smaller cross section in the area of the stator-side coils 140 and 141 than in the curved area 126 of the flux-guiding stator-side element 125.

Figure 7:
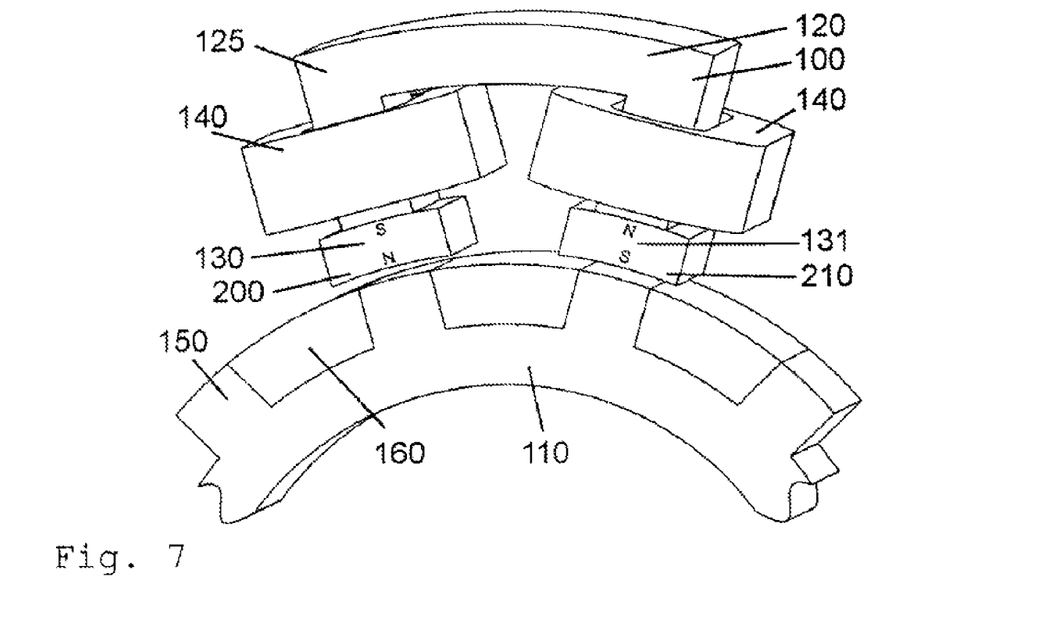

By way of example, FIG. 7 shows one exemplary embodiment which represents a form of combination of the exemplary embodiments shown in FIGS. 4 and 5. For example, FIG. 7 shows two stator-side magnets 130 and 131, which are arranged at the limb ends 200 and 210 of the flux-guiding stator-side element 125. The figure also shows that the cross section of the limb ends 200 and 210 and the cross section of the stator-side magnets 130 and 131 is larger than the cross section of the stator-side element 125 in the area of the two stator-side coils 140 and 141.

Figure 8:
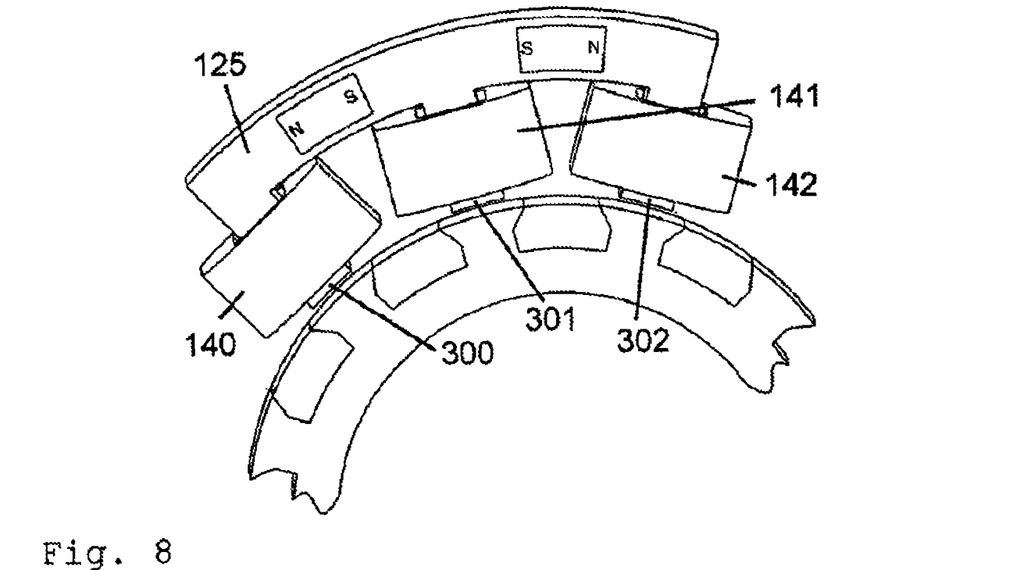

FIG. 8 shows one exemplary embodiment of a generator 60, in which the flux-guiding stator-side element 125 is like a comb or is in the form of a comb. Preferably, the stator-side element 125 is an annularly closed comb with limbs which are formed radially on the inside, of which three are annotated with the reference symbols 300, 301 and 302, by way of example, in FIG. 8.

The pole pitch of the stator and the pole pitch of the rotor are identical in the exemplary embodiment shown in FIG. 8, as a result of which the voltages induced in the stator-side coils 140, 141, 142 are either in phase or have a phase offset of 180°. Current and voltage can thus be produced for a single-phase power transmission system, by appropriate connection of the stator-side coils.

Figure 9:
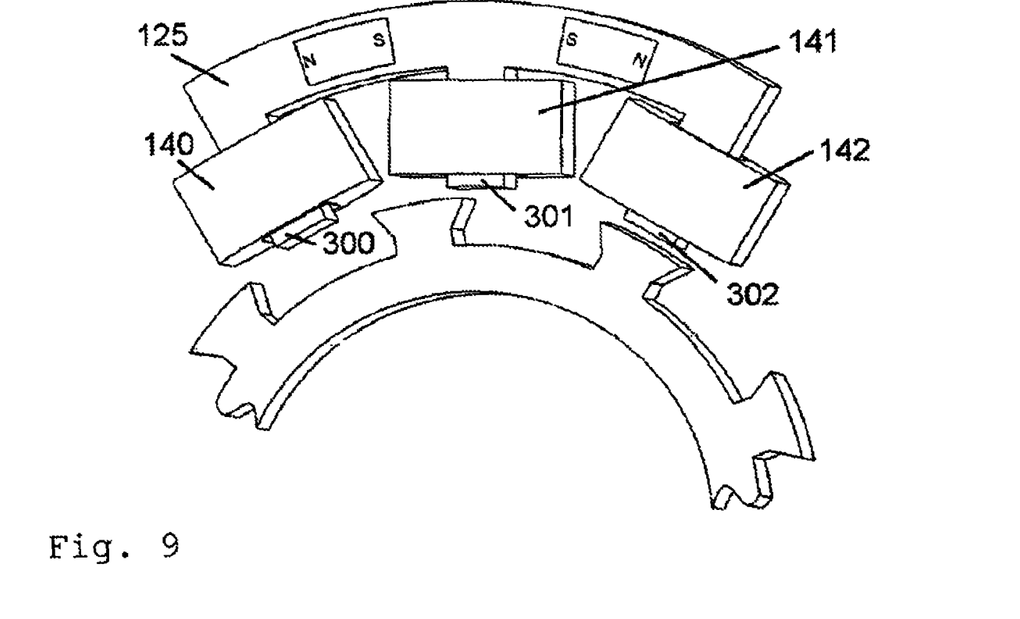

In the exemplary embodiment shown in FIG. 9, the flux-guiding stator-side element 125 is likewise formed by an annular element with a comb-like structure, as has already been explained in conjunction with FIG. 8. In contrast to the exemplary embodiment shown in FIG. 8, however, the pole pitch between the stator and the rotor is not identical, as a result of which the voltages induced in the stator-side coils 140, 141 and 142 have a phase offset with respect to one another, depending on the pole offset between the stator and the rotor. An offset such as this makes it possible to generate polyphase, for example three-phase, currents and voltages for a polyphase, in particular three-phase, power transmission system.

Figure 10:
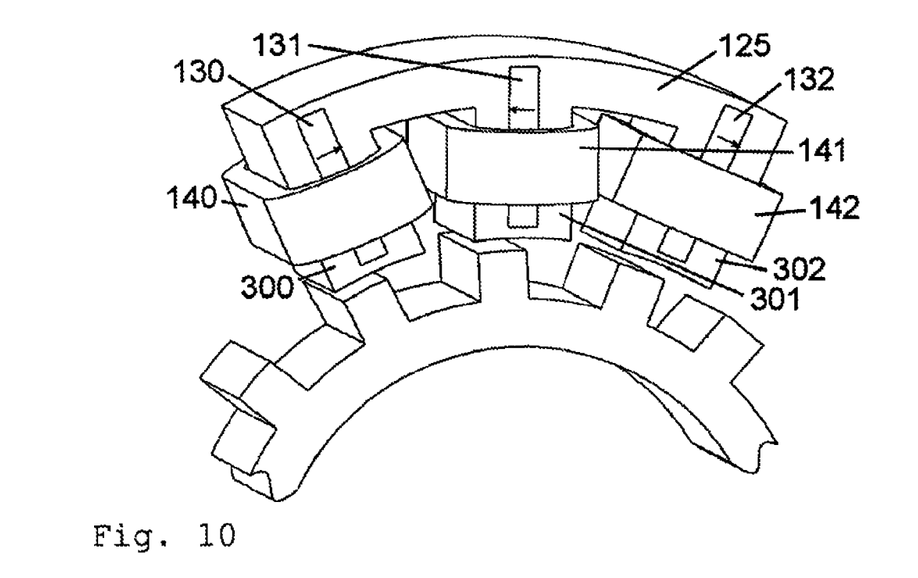

FIG. 10 shows one exemplary embodiment of a generator, in which the stator-side magnets 130, 131 and 132 are aligned along the longitudinal direction of the limbs 300, 301 and 302 of the flux-guiding, stator-side element 125. In this refinement, a relative rotation of the rotor relative to the stator results in a change in the direction of the lines of force within the limbs, and therefore to a phase change of the electrical voltages induced in the stator-side coils 140, 141 and 142.

Figure 11:
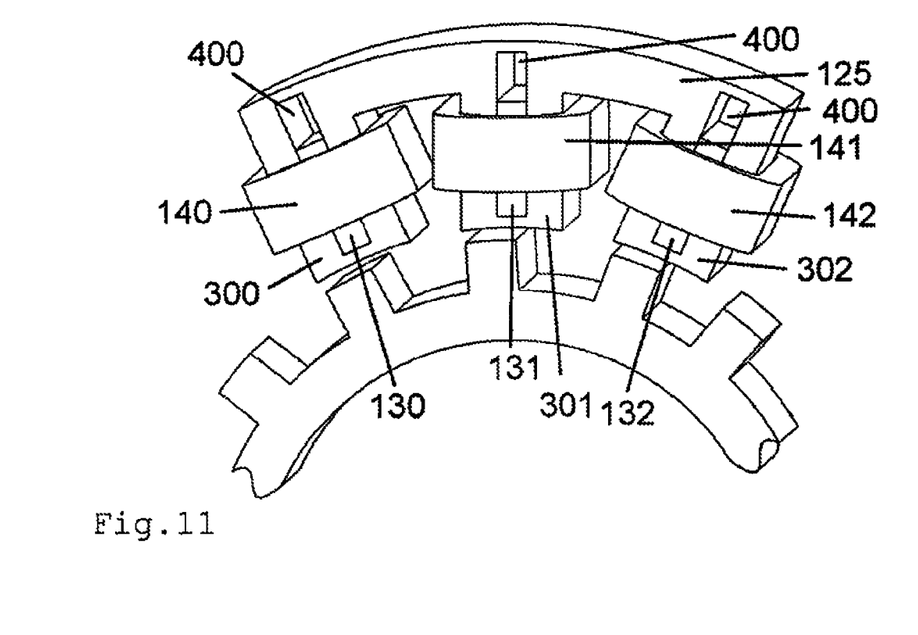

FIG. 11 shows one exemplary embodiment of a generator 60, in which flux barriers 400, which have a particularly high magnetic reluctance, are integrated in the limbs 300, 301 and 302 of the flux-guiding, stator-side element 125. The function of the flux barriers 400 is to guide the magnetic lines of force in a suitable manner within the flux-guiding, stator-side element 125 so as to achieve as high an efficiency level as possible.

Figure 12:
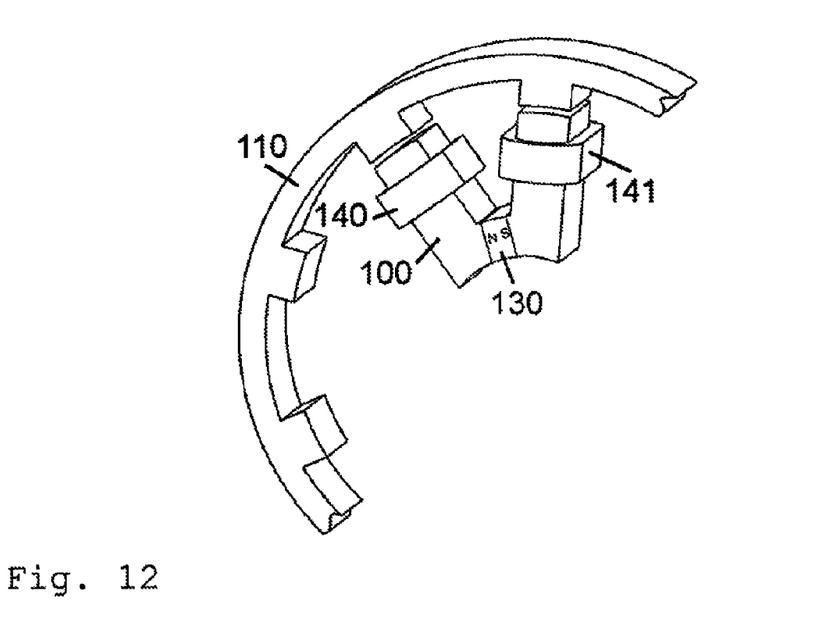

By way of example, FIG. 12 shows, as a representative of all the exemplary embodiments in FIGS. 2 to 11, the possibility of designing a generator 60 as shown in FIG. 1 such that the rotor-side section 110 can move externally around the stator-side section 100. All the embodiment variants shown in FIGS. 3 to 11 may be in the form of external rotors.

Figure 13:
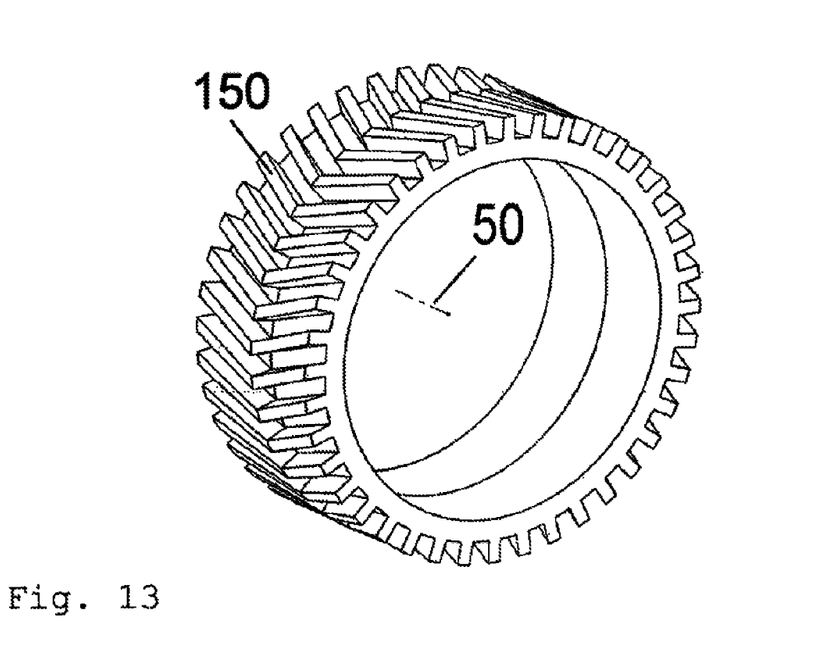
FIG. 13 shows one exemplary embodiment of obliquely running teeth of a rotor for the wind energy installation shown in FIG. 1.

By way of example, FIG. 13 illustrates that the teeth 150 need not necessarily run parallel to the rotation axis 50 shown in FIG. 1. As can be seen, in the exemplary embodiment shown in FIG. 11, the teeth 150 on the rotor are provided with an oblique profile; this is because the teeth 150 run obliquely or at an angle to the rotation axis 50 of the rotor.

In a corresponding manner, the limbs of the flux-guiding, stator-side element or elements 125 may also be aligned obliquely or at an angle to the rotation axis 50 of the generator.

Figure 14:
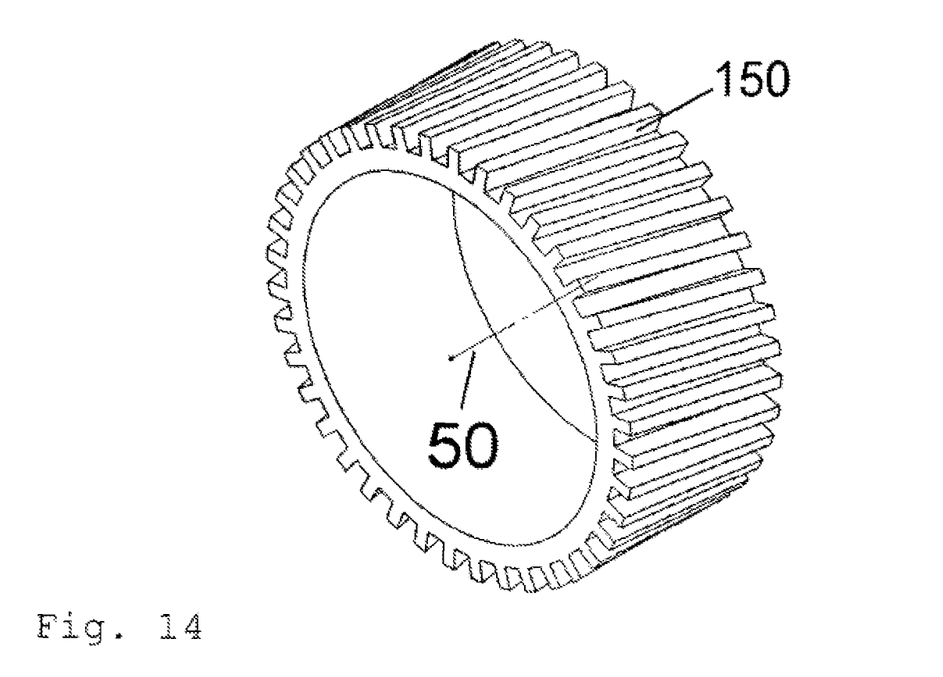
FIG. 14 shows a further exemplary embodiment of obliquely running teeth of a rotor for the wind energy installation shown in FIG. 1.

By way of example, FIG. 14 shows an inclined tooth shape, in which the teeth have an arrow-shaped incline. Therefore, one section of each tooth is in each case oriented away from the rotation axis while, in contrast, a further section, adjacent thereto, of the respective tooth is once again oriented toward the rotation axis—thus forming a structure per tooth which is arrow-shaped overall—seen along the rotation axis.

LIST OF REFERENCE SYMBOLS

10 Wind energy installation
20 Power transmission system
30 Propeller
40 Blade
50 Shaft
60 Generator
100 Stator-side section
110 Rotor-side section
120 Magnetic circuit
125 Stator-side element
126 Bottom area 127 Flux-guiding stator-side material
128 Stator inner face
129 Stator outer face
130 Magnet
131 Magnet
132 Magnet
140 Stator-side coil
141 Stator-side coil
142 Stator-side coil
150 Teeth
160 Gaps
200 Limb ends
210 Limb ends
300 Limb
301 Limb
302 Limb
400 Flux barrier
I Current
Rm Reluctance

The invention claimed is:

1. A wind or water energy installation for production of electrical energy comprising at least one propeller and at least one generator, the generator including a rotor, a stator having flux-guiding material, and at least one magnetic circuit producing a magnetic flux;
   wherein the at least one magnetic circuit comprises at least one stator-side magnet and at least one stator-side coil through which at least a portion of the magnetic flux of the stator-side magnet flows, and the magnetic circuit is closed by the rotor;
   wherein on its surface facing the stator, the rotor has a magnetic reluctance (Rm), which is dependent on its respective rotation angle, such that the magnitude of the magnetic flux in the at least one stator-side coil is dependent on the respective rotation angle of the rotor, and varies during rotation of the rotor; and
   wherein the stator has an inner face facing the rotor and an outer face facing away from the rotor, the at least one stator-side magnet being embedded in and completely surrounded by the flux-guiding material of the stator such that the at least one stator-side magnet is separated from the inner and outer faces of the stator by the flux-guiding material.

2. The wind or water energy installation as claimed in claim 1,
   wherein the propeller is connected to the rotor of the generator such that they rotate together.

3. The wind or water energy installation as claimed in claim 1,
   wherein the at least one stator-side magnet is a permanent magnet.

4. The wind or water energy installation as claimed in claim 1,
   wherein the at least one stator-side magnet is an electromagnet.

5. The wind or water energy installation as claimed in claim 1,
   wherein on its face facing the rotor, the stator has a multiplicity of magnetic circuits, which comprise in each case at least one stator-side magnet and in each case at least one stator-side coil and which are each closed by the rotor.

6. The wind or water energy installation as claimed in claim 1,
   wherein the arrangement of the magnetic circuits on the stator is rotationally symmetrical.

7. The wind or water energy installation as claimed in claim 1,
   wherein, on its surface facing the stator, the rotor is configured in a rotationally symmetrical manner with regard to the local distribution of its magnetic reluctance.

8. The wind or water energy installation as claimed in claim 6,
   wherein the rotational symmetry angle of the arrangement of the magnetic circuits on the stator and the rotational symmetry angle of the local distribution of the magnetic reluctance of the rotor are different.

9. The wind or water energy installation as claimed in claim 1,
   wherein, on its surface facing the stator, the rotor has teeth which extend radially on the outside.

10. The wind or water energy installation as claimed in claim 9,
    wherein the rotor may also rotate externally around the stator.

11. The wind or water energy installation as claimed in claim 9,
    wherein the intermediate space between adjacent teeth is entirely or partially filled with a material which has a higher magnetic reluctance than the material of the teeth.

12. The wind or water energy installation as claimed in claim 1,
    wherein the stator-side section of the at least one magnetic circuit has a flux-guiding element, which is passed through the at least one stator-side coil, with the cross-sectional area of the flux-guiding element being less than the cross-sectional area of the stator-side magnet.

13. The wind or water energy installation as claimed in claim 1,
    wherein the stator-side section of the at least one magnetic circuit has a flux-guiding stator-side element, which is passed through the at least one stator-side coil, with the cross-sectional area of the flux-guiding element in the coil area being less than the cross-sectional area of limb ends of the element, which form the interface to the rotor.

14. The wind or water energy installation as claimed in claim 1,
    wherein the stator-side sections of the magnetic circuits are each provided with at least one magnetic flux barrier.

15. A generator for use in a wind or water energy installation and configured to convert rotational energy into electric energy, the generator comprising:
    an inner rotor configured to rotate about a shaft;
    an outer stator disposed outside the rotor and having a flux-guiding element made of flux-guiding material, the outer stator having an inner face facing the inner rotor and an outer face facing away from the rotor; and
    at least one magnetic circuit including at least one stator-side magnet and at least one stator-side coil through which at least a portion of the magnetic flux of the stator-side magnet flows, the at least one stator-side magnet being embedded in and surrounded by the flux-guiding material such that the at least one magnet is separated from the inner face and outer face of the outer stator by the flux-guiding material;
    wherein the rotor has a magnetic reluctance (Rm) dependent on its respective rotation angle such that magnetic flux in the at least one stator-side coil is dependent on the respective rotation angle of the inner rotor.

16. The generator of claim 15, wherein a portion of the outer stator is U-shaped having two limbs that are each disposed through a magnetic coil, wherein each limb interacts with a portion of the inner rotor as the inner rotor rotates about the shaft to form a magnetic circuit.

17. The generator of claim 16, wherein the at least one magnet is embedded in a portion of the flux-guiding material that connects the two limbs of the U-shaped portion of the outer stator.

* * * * *